United States Patent [19]

Calianno

[11] Patent Number: 4,778,131
[45] Date of Patent: Oct. 18, 1988

[54] SQUARE CANOPY PARACHUTE
[75] Inventor: Carl Calianno, Hatboro, Pa.
[73] Assignee: United States of America as represented by the Secretary of the Navy, Washington, D.C.
[21] Appl. No.: 104,301
[22] Filed: Oct. 2, 1987
[51] Int. Cl.$^4$ .................. B64D 17/02; B64D 17/18
[52] U.S. Cl. .................................... 244/145; 244/152
[58] Field of Search ..................... 244/152, 142, 145

[56] References Cited
U.S. PATENT DOCUMENTS

| 1,511,154 | 10/1924 | Ball . | |
|---|---|---|---|
| 1,618,613 | 2/1927 | Turner . | |
| 1,951,864 | 3/1934 | Driggs, Jr. . | |
| 2,096,520 | 10/1937 | Knight | 244/145 |
| 2,374,627 | 4/1945 | Strong . | |
| 2,683,575 | 7/1954 | Heinrich . | |
| 2,746,699 | 5/1956 | Hart . | |
| 3,104,856 | 9/1963 | Knacke et al. . | |
| 3,195,842 | 7/1965 | Wilson . | |
| 3,474,990 | 10/1969 | Flatau . | |
| 3,727,863 | 4/1973 | Bockelmann | 244/145 |
| 3,848,834 | 11/1974 | Phillips, Jr. | 244/145 |
| 3,893,641 | 7/1975 | Sutton . | |
| 4,013,248 | 3/1977 | Kalabukhova et al. . | |
| 4,638,961 | 1/1987 | Rousseau . | |

FOREIGN PATENT DOCUMENTS 2627888  1/1977  Fed. Rep. of Germany ...... 244/152

Primary Examiner—Galen Barefoot
Attorney, Agent, or Firm—Henry Hansen; John M. O'Meara

[57] ABSTRACT

A low cost, high stability, high drag aerodynamic decelerator incorporating four slots in a square canopy. Each slot is 4/10 the length of the side of the square and is positioned so that a continuous line colinear with it bisects two adjacent sides of the canopy. The slots are further located so that each diagonal of the canopy bisects two of them. Suspension lines are fixed to and extend from the diagonals of the canopy, crossing the slots and keeping them essentially closed at their midpoints.

14 Claims, 1 Drawing Sheet

SQUARE CANOPY PARACHUTE

STATEMENT OF GOVERNMENT INTEREST

The invention described herein may be used by and for the Government of the United States of America for governmental purposes without the payment of any royalties thereon or therefor.

BACKGROUND OF THE INVENTION

This invention relates generally to aerodynamic decelerators and more particularly to the aerodynamic stabilization of parachutes having square canopies.

When dropping a store such as a sonobuoy into the ocean from a high altitude it is necessary to assure proper orientation upon impact. This requires that the parachute used have both high drag to slow descent and stability to minimize store oscillations. Since stability decreases as drag is increased and vice versa, optimizing these two characteristics is most desirable. Cost and simplicity are also factors in designing a parachute and must be weighed against drag and stability.

Currently, aerodynamic decelerators such as cross-type parachutes require from 8 to 12 suspension lines to provide sufficient drag, which adds to cost and packing complexity and creates possible entaglement problems. Attempts to simplify parachute design have led to the use of parachutes with square canopies, which although simple, are inherently unstable. Stability has been improved by reducing the ratio of suspension line length to nominal canopy diameter, and by using different suspension line arrangements, such as suspension line shapers and/or criss-cross configurations. Although these modifications enhance stability, an even further enhancement thereof without further sacrifice in drag and/or simplicity is desirable.

SUMMARY OF THE INVENTION

An object of the present invention is to provide an aerodynamic decelerator or parachute with both high drag and high stability. Another object is to accomplish this general object with a parachute having a square-shaped canopy. Yet another object is to provide means for delivering a store normal to the impact surface thereby assuring normal functioning after impact. Other objects include providing a low cost parachute, one with a simple design and that is easy to manufacture, and one requiring few suspension lines for ease of packing.

Briefly, these and other objects are accomplished by disposing slits or slots through a square canopy to substantially reduce the effect of vortices shed by the rim or periphery thereof during operation of a paracute. In one preferred embodiment, each slot is 30% to 40% of the length of the side or edge of the canopy. Another embodiment has each slot positioned so that a continuous imaginary line colinear with it bisects two adjacent sides of the canopy. In a further embodiment each diagonal of the canopy bisects two of the slots. Suspension lines are fixed to and extend from the diagonals of the canopy.

Other objects, advantages, and novel features of the invention will become apparent from the following detailed description of the invention when considered in conjunction with the accompanying drawings wherein:

DESCRIPTION OF THE PREFERRED EMBODIMENT

Figure 1:
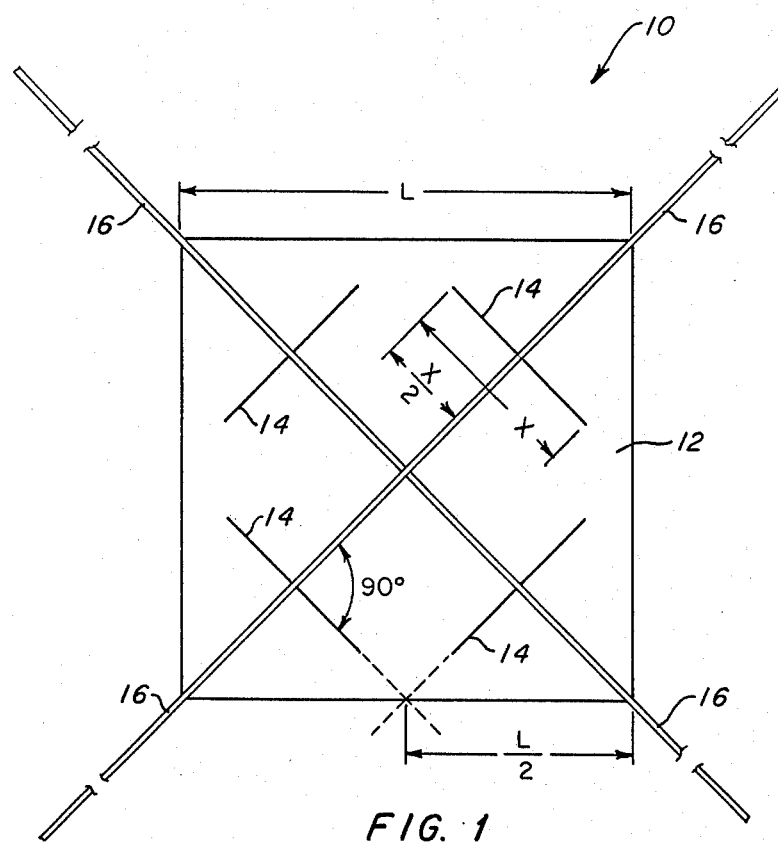
FIG. 1 is a top view of a parachute according to the invention.
Figure 2:
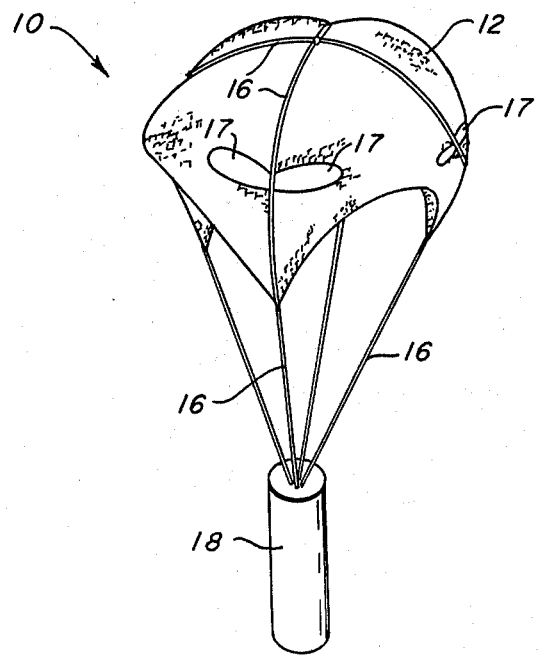
FIG. 2 is a side view of the parachute of FIG. 1 in operation.

Referring now to the drawings wherein like characters designate like or corresponding parts throughout the several views, there is shown in FIGS. 1 and 2 a parachute 10 according to the present invention. Canopy 12 of parachute 10 is essentially square-shaped, with each side being of equal length L. The length L is selected based on desired drag, in that drag increases with increasing canopy area. Slits or slots 14 are cut through canopy 12 as shown in FIG. 1 to substantially reduce the effect of vortex shedding by the rim or periphery of canopy 12 during operation of parachute 10. In one preferred embodiment, each slot length X is between 30% and 40% of the length L of the side or edge of the square, preferably 40%. Slots 14 are positioned so that continuous imaginery lines, each colinear with only one of the slots, intersect to form a square whose corners intersect the sides of canopy 12. More particularly, each slot may be positioned so that a continuous line colinear with it bisects two adjacent sides of canopy 12. Furthermore, slots 14 may be positioned so that each diagonal of canopy 12 bisects exactly two of them. Canopy 12 may be fabricated from any commonly used parachute material such as nylon. A preferred means for cutting slots 14 through a nylon canopy 12 is to sear the canopy with a hot blade. This causes the material along the edge to melt, preventing frying.

In a preferreed embodiment, suspension lines 16 are attached to canopy 12 across the entire diagonal length thereof and extend from its corners, with one suspension line 16 overlapping the other at the center of the square. The length they extend from the corners may vary, typically being the same length as the nominal diameter of canopy 12. Suspension lines 16 are attached to canopy 12 when it is lying flat so that the material of the canopy is interconnected at the midpoint of each slot 14 by the suspension lines. Therefore, when canopy 12 is inflated during operation of parachute 10, each slot 14 actually forms two openings 17, one on each side of suspension line 16, as shown in FIG. 2. Suspension lines 16 may be fabricated from any commonly used material, such as nylon.

In operation, the extended ends of suspension lines 16 are attached to store 18 as shown in FIG. 2 and parachute 10 and store 18 are dropped. When canopy 12 inflates, openings 17 develop due to the existence of slots 14 and permit air to flow therethrough. Such flow serves to reduce vortex growth along the outer rim or periphery of canopy 12 prior to shedding, thus reducing the aerodynamic side forces which destabilize the canopy. Of course, such destabilizing aerodynamic side forces are translated to store 18 through suspension lines 16, causing the store to oscillate. The oscillating store 18 may then land at an angle rather than normal to the impact surface, as is desired when the store is a sonobuoy. The more-stable canopy of the present invention tends to impart only vertical forces to store 18, allowing it to land normal to the impact surface.

Some of the many advantages and novel features of the invention should now be readily apparent. For instance, a square-shaped parachute 10 with both high drag and high stability is provided thereby permitting the delivery of a store 18 at a substantially perpendicular orientation with an impact surface. The parachute of the preferred embodiment is also low cost and simple in design, being square-shaped with only four suspension lines, and is easy to manufacture, as slots are easily cut into the canopy.

Other embodiments and modifications of the present invention may readily come to those of ordinary skill in the art having the benefit of the teachings presented in the foregoing description and drawings. For instance, slot size may vary within the range stated and of course drag is decreased with increased slot size. Slot location may vary as well. As the slots are moved closer to the corners, drag increases and stability decreases. Opening performance of the parachute is adversely affected as slots are moved toward the center. Materials, canopy size, and suspension line length may also be modified. Therefore, it is to be understood that the present invention is not to be limited to such teachings presented, and that such further embodiments and modifications are intended to be included within the scope of the appended claims.

What is claimed is:

1. A parachute, comprising:
a square-shaped canopy having four slots therein, each slot having length approximately 30% to 40% of the length of a side of said canopy, said slots being positioned so that four continuous lines, each colinear with only one of said slots, form an inner square whose corners intersect the sides of said canopy.

2. A parachute according to claim 1 wherein the corners of said inner square bisect the four sides of said canopy.

3. A parachute according to claim 2 wherein the diagonals of said canopy bisect two of said slots.

4. A parachute according to claim 3 further comprising suspension lines fixed to and extending from the corners of said canopy.

5. A parachute according to claim 4 wherein said suspension lines extend across and are fixed to the diagonals of said canopy maintaining each of said slots essentially closed at the midpoint thereof.

6. A parachut, comprising:
a square-shape canopy having four slots therein, each slot having length approximately 40% of the length of a side of said canopy and being positioned so that a continuous line colinear with said slot bisects two adjacent sides of said canopy, said slots being located so that each diagonal of said canopy bisects two of said slots.

7. A parachute according to claim 6 further comprising suspension lines fixed to said canopy along the diagonals thereof and extending from the corners thereof, said suspension lines maintaining said slots essentially closed at respective midpoints thereof.

8. In a parachute of the type having a square-shaped canopy, the improvement comprising:
slits disposed through said canopy to substantially reduce the effect of vortices shed by the edges of said canopy during the operation of the parachute, said slits being located colinearly along imaginery lines which intersect to form a square within the periphery of said canopy.

9. The parachute of claim 8 wherein the corners of the square bisect the canopy edges.

10. The parachute of claim 8 wherein the length of each slit is between 30% and 40% of the length of the canopy edges.

11. The parachute of claim 8 wherein each slit is bisected by one of the diagonals extending between the corners of said canopy.

12. The parachute of claim 11 wherein suspension lines are affixed on said canopy across the diagonals and extend from the corners of said canopy, the material of said canopy being interconnected across said slits by said suspension lines to hold said slits closed at the midpoint thereof.

13. The parachute of claim 8 wherein suspension lines are affixed to said canopy and extend from the corners thereof.

14. A parachute assembly, comprising:
a square-shaped canopy having slits disposed therethrough to substantially reduce the effect of vortices shed by the edges of said canopy during operation of the parachute assembly, the slits being located colinearly along imaginary lines with intersect to form a square within the periphery of said canopy and the corners of the square bisect the canopy edges, each slit being bisected by one of the diagonals extending between the corners of said canopy and having a length between 30% and 40% of the length of each canopy edge; and
suspension lines extending from the corners of said canopy, said suspension lines being affixed across the canopy diagonals with the material of said canopy being interconnected across each slit at the midpoint thereof.

* * * * *